United States Patent
Tojima et al.

(10) Patent No.: US 10,637,305 B2
(45) Date of Patent: Apr. 28, 2020

(54) DOUBLE STATOR-TYPE ROTARY MACHINE

(71) Applicant: IHI Corporation, Tokyo (JP)

(72) Inventors: Narifumi Tojima, Tokyo (JP); Takehiro Jikumaru, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/487,541

(22) Filed: Apr. 14, 2017

(65) Prior Publication Data
US 2017/0222499 A1    Aug. 3, 2017

Related U.S. Application Data

(63) Continuation of application No. PCT/JP2015/079280, filed on Oct. 16, 2015.

(30) Foreign Application Priority Data

Oct. 17, 2014   (JP) ................................ 2014-212437

(51) Int. Cl.
| | | |
|---|---|---|
| *H02K 1/24* | (2006.01) | |
| *H02K 1/27* | (2006.01) | |
| *H02K 16/04* | (2006.01) | |
| *H02K 1/14* | (2006.01) | |
| H02K 21/22 | (2006.01) | |
| H02K 19/10 | (2006.01) | |

(52) U.S. Cl.
CPC ............... *H02K 1/146* (2013.01); *H02K 1/24* (2013.01); *H02K 1/27* (2013.01); *H02K 16/04* (2013.01); *H02K 19/103* (2013.01); *H02K 21/22* (2013.01)

(58) Field of Classification Search
CPC ............ H02K 16/04; H02K 1/24; H02K 1/27; H02K 1/2753; H02K 16/00; H02K 16/02
USPC ........................................................ 310/112
See application file for complete search history.

(56) References Cited

U.S. PATENT DOCUMENTS

| | | |
|---|---|---|
| 5,111,096 A | 5/1992 | Horst |
| 5,122,697 A | 6/1992 | Horst |
| 5,294,856 A | 3/1994 | Horst |
| 5,783,893 A | 7/1998 | Dade et al. |
| 6,459,185 B1 * | 10/2002 | Ehrhart ................... H02K 1/20 310/156.35 |
| 2007/0090708 A1 | 4/2007 | Takahashi et al. |

(Continued)

FOREIGN PATENT DOCUMENTS

| | | |
|---|---|---|
| CN | 103023245 A | 4/2013 |
| CN | 104099754 A | 10/2014 |

(Continued)

OTHER PUBLICATIONS

Asano et al., machine translation of jp2010004634, Jan. 2010 (Year: 2010).*

(Continued)

*Primary Examiner* — Tran N Nguyen
*Assistant Examiner* — Eric Johnson
(74) *Attorney, Agent, or Firm* — Rothwell, Figg, Ernst & Manbeck, P.C.

(57) ABSTRACT

This double stator-type rotary machine is provided with: an annular rotor; an outer stator that is disposed on the outer side of the rotor; and an inner stator that is disposed on the inner side of the rotor. The rotor is provided with permanent magnets that are arranged on the inner stator side.

7 Claims, 4 Drawing Sheets

(56) References Cited

U.S. PATENT DOCUMENTS

| | | |
|---|---|---|
| 2010/0213885 A1 | 8/2010 | Ichiyama |
| 2010/0244616 A1 | 9/2010 | Li et al. |
| 2011/0285238 A1 | 11/2011 | Kusase et al. |
| 2013/0093275 A1* | 4/2013 | Kim |
| 2013/0099618 A1* | 4/2013 | Kusase .................. H02K 3/28 310/156.56 |
| 2014/0159532 A1* | 6/2014 | Kondou ................ H02K 1/276 310/156.53 |
| 2014/0159533 A1* | 6/2014 | Kondou ................ H02K 1/276 310/156.53 |
| 2015/0137655 A1* | 5/2015 | Maekawa ................ H02K 1/30 310/216.129 |
| 2016/0009185 A1* | 1/2016 | Sonoda ................ B60K 6/485 701/22 |
| 2016/0028296 A1* | 1/2016 | Kusase .................. H02K 21/12 310/156.01 |
| 2016/0043619 A1* | 2/2016 | Maekawa ............. H02K 16/04 310/156.08 |

FOREIGN PATENT DOCUMENTS

| | | | |
|---|---|---|---|
| EP | 2 133 981 A2 | 12/2009 | |
| JP | 5-176504 A | 7/1993 | |
| JP | 5-292716 A | 11/1993 | |
| JP | 5-336715 A | 12/1993 | |
| JP | 7-163105 A | 6/1995 | |
| JP | 8-214519 A | 8/1996 | |
| JP | 9-285086 A | 10/1997 | |
| JP | 10-70875 A | 3/1998 | |
| JP | 3060610 B2 | 7/2000 | |
| JP | 2001-186693 A | 7/2001 | |
| JP | 3188727 B2 | 7/2001 | |
| JP | 3245944 B2 | 1/2002 | |
| JP | 2002281722 A * | 9/2002 | ............ H02K 29/03 |
| JP | 2004-64891 A | 2/2004 | |
| JP | 3633272 B2 | 3/2005 | |
| JP | 3704857 B2 | 10/2005 | |
| JP | 2006-246871 A | 9/2006 | |
| JP | 2007-74776 A | 3/2007 | |
| JP | 2007202333 A * | 8/2007 | |
| JP | 2007-282331 A | 10/2007 | |
| JP | 2008-302789 A | 12/2008 | |
| JP | 2009-136150 A | 6/2009 | |
| JP | 2010004634 A * | 1/2010 | |
| JP | 2010-98802 A | 4/2010 | |
| JP | 2010-158130 A | 7/2010 | |
| JP | 4539216 B2 | 9/2010 | |
| JP | 2011-50186 A | 3/2011 | |
| JP | 2011-67070 A | 3/2011 | |
| JP | 4655084 B2 | 3/2011 | |
| JP | 2011-199995 A | 10/2011 | |
| JP | 2011-244643 A | 12/2011 | |
| JP | 4923633 B2 | 4/2012 | |
| JP | 2013-74743 A | 4/2013 | |
| JP | 2014-132817 A | 7/2014 | |
| JP | 2014-176284 A | 9/2014 | |

OTHER PUBLICATIONS

Naruse, machine translation of jp2007202333, Aug. 2007 (Year: 2007).*

Sumiya et al., machine translation of jp2002281722, Sep. 2002 (Year: 2002).*

Ion Boldea, "Chapter 9. Switched Reluctance Generators and Their Control" "Variable Speed Generators," pp. 9-10 to 9-36 (14 pages).

* cited by examiner

DOUBLE STATOR-TYPE ROTARY MACHINE

CROSS-REFERENCE TO RELATED APPLICATIONS

The present application is a continuation application of International Application No. PCT/JP2015/079280, filed Oct. 16, 2015, which claims priority to Japanese Patent Application No. 2014-212437, filed Oct. 17, 2014. The contents of these applications are incorporated herein by reference in their entirety.

TECHNICAL FIELD

The present disclosure relates to a double stator-type rotary machine.

BACKGROUND

Conventionally, permanent magnet (PM) motors in which a permanent magnet is provided in a rotor or switched reluctance (SR) motors in which a permanent magnet is not provided but a salient pole is provided in a rotor have been used. Also, in recent years, research and development on switched reluctance rotary machines as a low-cost and highly reliable rotary machine have been conducted. Although such switched reluctance rotary machines have fundamental problems such as vibration and noise, studies for resolving such problems have been proposed, as shown in Patent Document 1 or Patent Document 2, for example. Also, background art is disclosed in Patent Documents 3 to 6.

DOCUMENTS OF THE RELATED ART

Patent Document

[Patent Document 1]
Japanese Unexamined Patent Application, First Publication No. H05-336715
[Patent Document 2]
Japanese Unexamined Patent Application, First Publication No. 2001-186693
[Patent Document 3]
Japanese Unexamined Patent Application, First Publication No. 2014-132817
[Patent Document 4]
Japanese Unexamined Patent Application, First Publication No. 2011-050186
[Patent Document 5]
Japanese Unexamined Patent Application, First Publication No. 2013-074743
[Patent Document 6]
Japanese Unexamined Patent Application, First Publication No. 2010-158130

SUMMARY

To improve the performance of a switched reluctance rotary machine as described above, it has been proposed to employ a double stator structure in the rotary machine. Such a double stator-type rotary machine has a structure including a stator on each of the outer side and the inner side of an annular rotor.

However, when such a switched reluctance rotary machine is considered to be applied to a motor, since a circumferential length of a stator on the outer side of the rotor and a circumferential length of a stator on the inner side of the rotor are different from each other, it is substantially structured to include two motors that are different in size. Therefore, at the time of high power output for which a torque is applied to the rotor from both of the stators, a large difference occurs between the torque applied to the rotor from the stator on the outer side of the rotor and the torque applied to the rotor from the stator on the inner side of the rotor. This difference between the two torques degrades motor efficiency.

The present disclosure has been made in view of the above-described problems and an objective of the present disclosure is to improve motor efficiency in the double stator-type rotary machine.

In order to achieve the above-described objective, a double stator-type rotary machine of the present disclosure includes an annular rotor, an outer stator disposed on the outer side of the rotor, and an inner stator disposed on the inner side of the rotor, wherein the rotor includes a permanent magnet provided on the inner stator side.

According to the present disclosure, a permanent magnet is provided on the inner side portion of a rotor in a double stator-type rotary machine in which a stator is respectively provided on the inner side and outer side of the rotor. Thereby, the outer side of the rotor can be operated as a switched reluctance (SR) motor and the inner side of the rotor can be operated as a permanent magnet (PM) motor. It is well known that a torque of the PM motor is larger than that of a same-sized SR motor. Therefore, according to the present disclosure, it is possible to add the torque applied from the inner stator of the rotor having a small diameter to the rotor compared to the case in which the permanent magnet is not provided. As a result, a difference between the torque applied to the rotor from the outer stator and the torque applied to the rotor from the inner stator is suppressed. It is possible to increase motor efficiency by reducing the difference between the two torques.

DETAILED DESCRIPTION

Hereinafter, one embodiment of a double stator-type rotary machine according to the present disclosure will be described with reference to the drawings. Also, in the following embodiments, an example in which the double stator-type rotary machine of the present disclosure is applied to a motor (a double stator-type motor) will be described.

Figure 1:
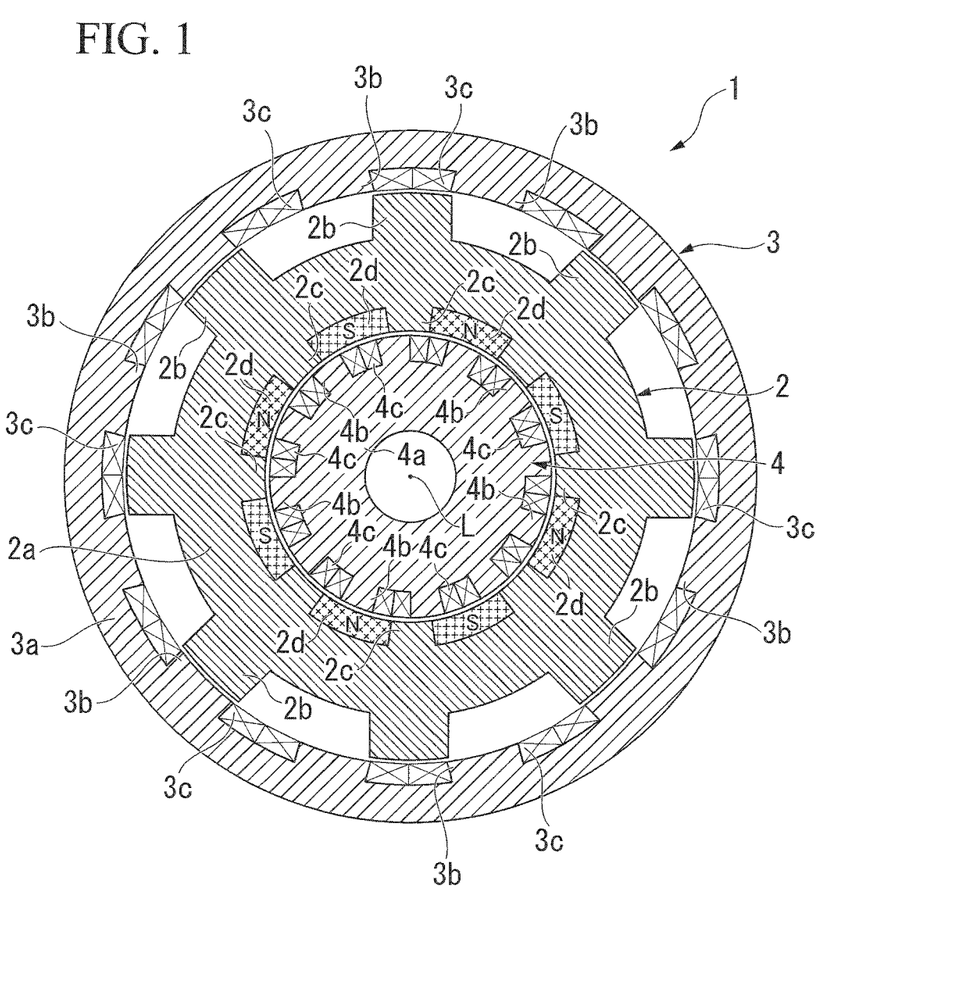
FIG. 1 is a cross-sectional view of a double stator-type motor according to one embodiment of the present disclosure.

FIG. 1 is a cross-sectional view of a double stator-type motor 1 of the present embodiment. According to FIG. 1, a rotor 2, an outer stator 3, and an inner stator 4 are provided in the double stator-type motor 1 of the present embodiment. Also, necessary components such as a casing, a shaft, and a control circuit are provided in the double stator-type motor 1 of the present embodiment although they are not shown in FIG. 1.

The rotor 2 has an annular shape centered on a rotor shaft L and is rotatably supported about the rotor shaft L by bearings or the like that are not shown. An annular yoke portion 2a, outer salient poles 2b protruding from the yoke portion 2a toward an outer side of the rotor 2, and inner salient poles 2c protruding from the yoke portion 2a toward an inner side of the rotor 2 are provided in this rotor 2. The yoke portion 2a, outer salient poles 2b, and inner salient poles 2c are formed by electromagnetic steel sheets stacked along the rotor shaft L and a bolt (not shown) for fastening them to each other. In addition, permanent magnets 2d are provided in the rotor 2.

The outer salient poles 2b protrude from an outer circumferential surface of the yoke portion 2a toward the outer stator 3 and the outer salient poles 2b are provided at regular intervals in a circumferential direction of the rotor 2. Also, in the present embodiment, eight outer salient poles 2b are provided at intervals of 45° as shown in FIG. 1. The inner salient poles 2c protrude from an inner circumferential surface of the yoke portion 2a toward the inner stator 4 and the inner salient poles 2c are provided at regular intervals in the circumferential direction of the rotor 2. Also, in the present embodiment, as shown in FIG. 1, eight inner salient poles 2c are provided at intervals of 45° in the same phase as the outer salient poles 2b.

Figure 2:
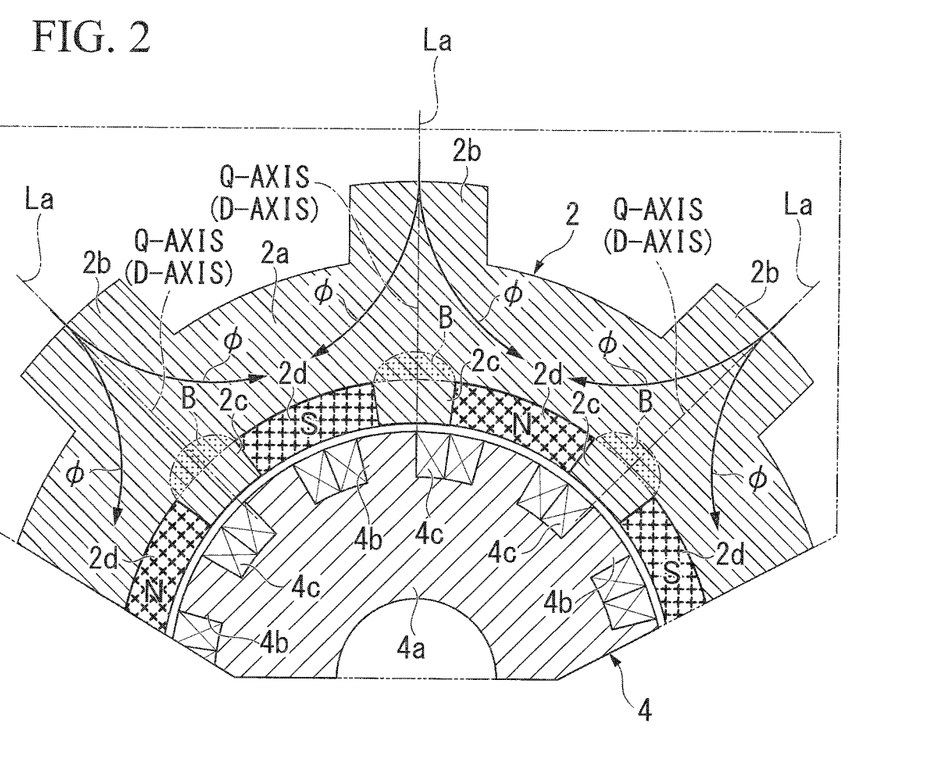
FIG. 2 is a partially enlarged view of the double stator-type motor according to one embodiment of the present disclosure.

FIG. 2 is a partially enlarged view of the rotor 2. As shown in FIG. 2, each of the outer salient poles 2b is disposed at the center of adjacent permanent magnets 2d in the circumferential direction of the rotor 2. As will be described below, the adjacent permanent magnets 2d are provided so that magnetic poles facing the inner stator 4 are reversed. That is, one of the two adjacent permanent magnets 2d faces the inner stator 4 with the S pole and the other faces the inner stator 4 with the N pole. Therefore, a q-axis perpendicular to a direction of magnetic flux generated by the permanent magnets 2d (a d-axis) is provided along a radial direction of the rotor 2 at an intermediate position between the adjacent permanent magnets 2d. As described above, the central axis La of the outer salient pole 2b is disposed to overlap the q-axis by disposing the outer salient pole 2b at the center of the adjacent permanent magnets 2d.

Permanent magnets 2d are arranged in the circumferential direction of the rotor 2 and are provided on the side of the inner stator 4 of the rotor 2 by fitting the respective permanent magnets 2d into the gaps between adjacent inner salient poles 2c. The permanent magnets 2d are provided so that the magnetic poles facing the inner stator 4 are alternately reversed. Also, in FIGS. 1 and 2, the magnetic poles facing the inner stator 4 are indicated as "S" and "N". Also, the thickness of the permanent magnets 2d in the radial direction of the rotor 2 is set to be the same as that of the inner salient poles 2c. Thereby, the inner circumferential surface of the rotor 2 is formed in a substantially circular shape with little irregularity.

The outer stator 3 is disposed on the outer side of the rotor 2 and has an annular shape centered on the rotor shaft L to surround the rotor 2 from a radial outer side. In such an outer stator 3, an annular yoke portion 3a and salient poles 3b protruding from the yoke portion 3a toward the inner side of the rotor 2 are provided. The yoke portion 3a and salient poles 3b are integrally formed of a magnetic material. In addition, a coil 3c wound around the salient poles 3b is provided in the outer stator 3.

The salient poles 3b protrude from an inner circumferential surface of the yoke portion 3a toward the rotor 2 and the salient poles 3b are provided at regular intervals in a circumferential direction of the outer stator 3. Also, in the present embodiment, twelve salient poles 3b are provided at intervals of 30° as shown in FIG. 1. The coil 3c is arranged in the order of U-phase, V-phase, and W-phase in the circumferential direction.

The inner stator 4 is disposed on the inner side of the rotor 2 to be surrounded by the rotor 2 from the radial outer side and has an annular shape centered on the rotor shaft L. In such an inner stator 4, an annular yoke portion 4a and salient poles 4b protruding from the yoke portion 4a toward an outer side of the yoke portion 4a are provided. The yoke portion 4a and salient poles 4b are integrally formed of a magnetic material. In addition, a coil 4c wound around the salient poles 4b is provided in the inner stator 4.

The salient poles 4b protrude from an outer circumferential surface of the yoke portion 4a toward the rotor 2 and the salient poles 4b are provided at regular intervals in a circumferential direction of the inner stator 4. Also, in the present embodiment, twelve salient poles 4b are provided at intervals of 30° as shown in FIG. 1. The coil 4c is arranged in the order of U-phase, V-phase, and W-phase in the circumferential direction.

In such a double stator-type motor 1 of the present embodiment, when power is supplied to the coil 3c of the outer stator 3, a magnetic field is foil led by the coil 3c. A torque is applied to the rotor 2 by this magnetic field acting on the outer salient pole 2b. Also, when power is supplied to the coil 4c of the inner stator 4, a magnetic field is formed by the coil 4c. A torque is applied to the rotor 2 by this magnetic field acting on the inner salient poles 2c and the permanent magnets 2d.

Here, in the double stator-type motor 1 of the present embodiment, the permanent magnets 2d are provided on the inner stator 4 side of the rotor 2. Therefore, the outer side of the rotor 2 can be operated as a switched reluctance (SR) motor, and the inner side of the rotor 2 can be operated as a permanent magnet (PM) motor. A torque of the PM motor is larger than that of a same-sized SR motor. Therefore, in the double stator-type motor 1 of the present embodiment, it is possible to increase the torque applied from the inner stator 4 having a small diameter to the rotor 2 compared to the case in which the permanent magnets 2d are not provided. As a result, a difference between the torque applied to the rotor 2 from the outer stator 3 and the torque applied to the rotor 2 from the inner stator 4 can be suppressed by bringing the torque applied to the rotor 2 from the inner stator 4 having a small diameter close to the torque applied to the rotor 2 from the outer stator 3 having a large diameter. It is possible to increase motor efficiency by reducing the difference between the two torques.

Also, in the double stator-type motor 1 of the present embodiment, the outer salient pole 2b of the rotor 2 is disposed at the center of adjacent permanent magnets 2d in the circumferential direction of the rotor 2. Thus, as shown in FIG. 2, the q-axis and the central axis La of the outer salient pole 2b are overlapped. As shown in FIG. 2, in the outer salient pole 2b functioning as the SR motor, magnetic flux φ passing through a certain outer salient pole 2b passes through the inside of the rotor 2 in the manner of drawing an arc which curves toward the adjacent outer salient pole 2b. On the other hand, in each inner salient pole 2c functioning as the PM motor, a region B having a high magnetic flux density is formed between adjacent permanent magnets 2d as shown in FIG. 2. Here, when the q-axis and the central axis La of the outer salient pole 2b are overlapped as described above, as shown in FIG. 2, since it is possible to prevent a passing region through which the magnetic flux φ passes and the region B having a high magnetic flux density from overlapping with each other, interference between the magnetic flux φ and the region B can be suppressed. Therefore, according to the double stator-type motor 1 of the present embodiment, the magnetic flux φ can easily pass through the rotor 2 and performance as the SR motor can be sufficiently exhibited.

In addition, when the ease of the magnetic flux φ in passing through the rotor 2 is considered as described above, it is suitable that the radial thickness of the rotor 2 be as thick as possible within a range in which a weight increase and a size increase are allowed so that interference between the magnetic flux φ and the region B can be avoided.

Also, in the double stator-type motor 1 of the present embodiment, the permanent magnets 2d are fitted in the gaps between adjacent inner salient poles 2c. Thereby, the permanent magnets 2d are firmly fixed to the yoke portion 2a. Thus, it is possible to prevent the permanent magnets 2d from separating from the yoke portion 2a and causing vibration or noise even when the double stator-type motor 1 is used for a long time.

Figure 3:
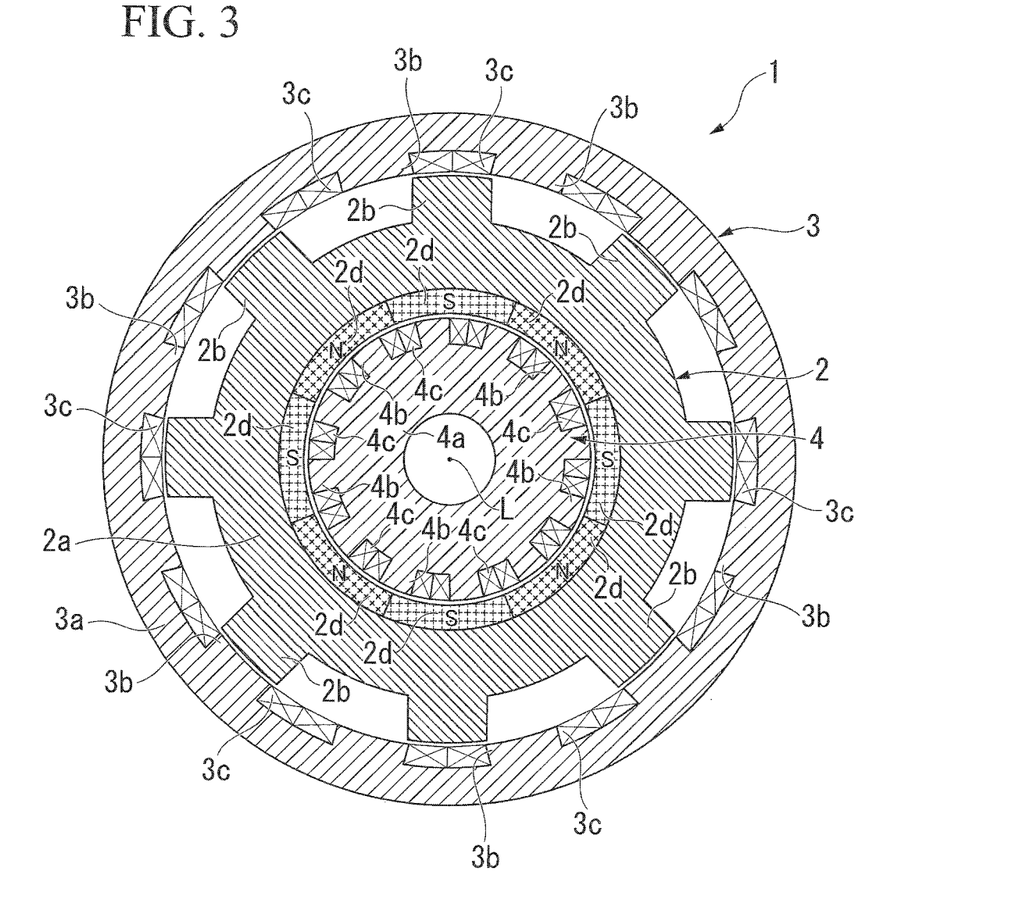
FIG. 3 is a cross-sectional view of a modified example of the double stator-type motor according to one embodiment of the present disclosure.

In addition, the present disclosure is not limited to the above-described embodiment, and the following modified example can be considered, for example. (1) In the above-described embodiment, the permanent magnets 2d are fitted in the gaps between the adjacent inner salient poles 2c of the rotor 2, but the present disclosure is not limited thereto. For example, as shown in FIG. 3, an inner circumferential surface of a rotor 2 may be formed in a circular shape when viewed in a direction of a rotor shaft L so that permanent magnets 2d can be provided on the inner circumferential surface. By employing such a constitution, the permanent magnets 2d can be installed without depending on a shape or layout of inner salient poles 2c. For example, it is easy to change the thickness of the permanent magnets 2d. In addition, as shown in FIG. 3, it is possible to maximize the size of the permanent magnets 2d in a circumferential direction by bringing the adjacent permanent magnets 2d into contact with each other. Thereby, it is possible to generate a more powerful torque.

Figure 4:
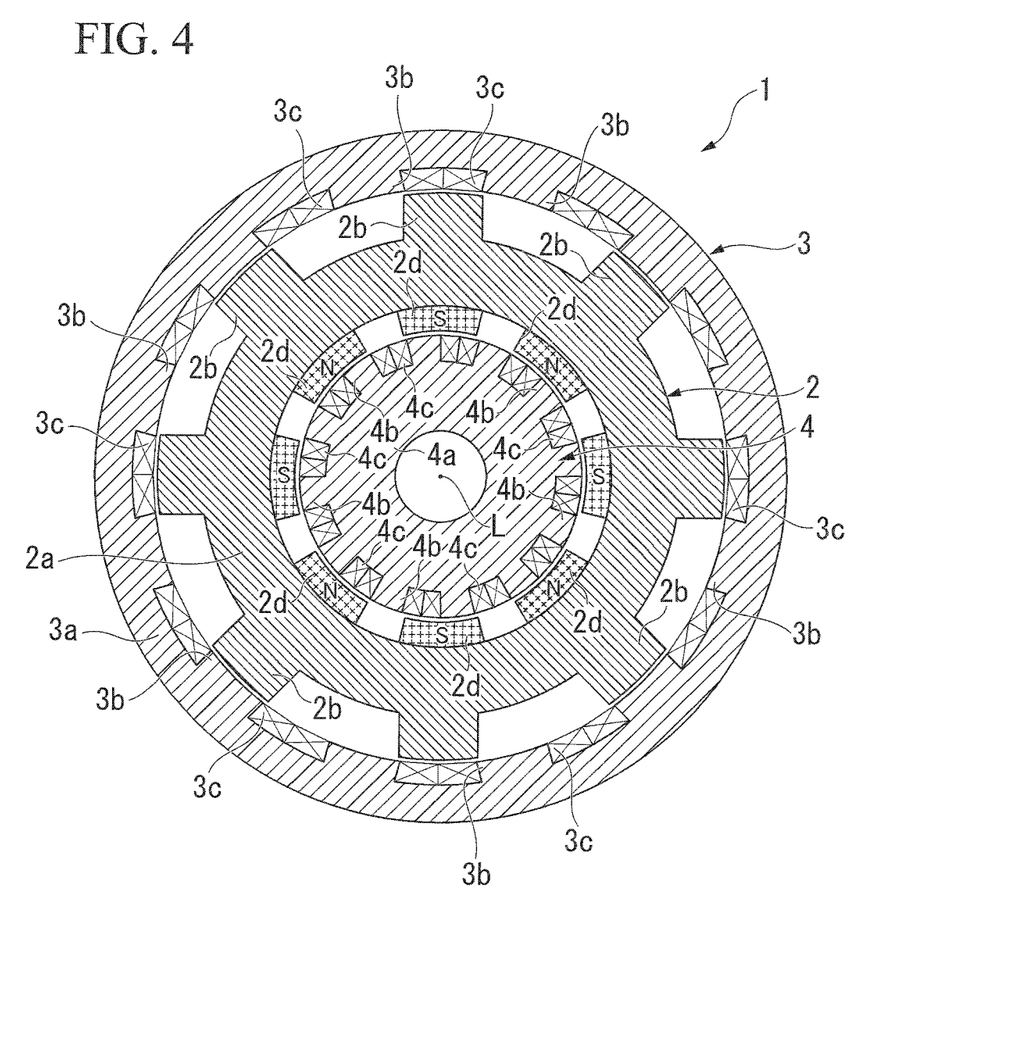
FIG. 4 is a cross-sectional view of a modified example of the double stator-type motor according to one embodiment of the present disclosure.

(2) As shown in FIG. 4, the above-described modified example may be further modified and permanent magnets 2d may be arranged to be spaced apart from each other. Thereby, it is not necessary to bring all the permanent magnets 2d into contact with each other at the time of assembling. Therefore, mounting of the permanent magnets 2d can be easily performed.

(3) In the above-described embodiment, a surface permanent magnet (SPM) type in which the permanent magnets 2d are exposed on the surface of the rotor 2 is employed for the double stator-type motor 1, but the present disclosure is not limited thereto. It is possible to employ an interior permanent magnet (IPM) type in which permanent magnets 2d are buried inside a rotor 2, for example.

(4) In the above-described embodiment, the double stator-type motor 1 which is a three-phase motor of U-phase, V-phase, and W-phase and having a structure in which the number of poles of each of the outer stator 3 and the inner stator 4 is twelve and the number of poles of the rotor 2 is eight is employed, but the present disclosure is not limited thereto. It is possible to change the number of poles of each of an outer stator 3, an inner stator 4, and a rotor 2.

(5) In the above-described embodiment, an example in which the present disclosure is applied to the double stator-type motor 1 is described, but the present disclosure is not limited thereto. The present disclosure can be applied to other rotary machines such as electric generators.

INDUSTRIAL APPLICABILITY

According to the double stator-type rotary machine of the present disclosure, motor efficiency can be improved.

What is claimed is:

1. A double stator-type rotary machine comprising:
an annular rotor;
an outer stator disposed on an outer side of the rotor in a radial direction thereof; and
an inner stator disposed on an inner side of the rotor in the radial direction of thereof;
wherein the annular rotor includes:
an annular-shaped yoke portion; and
outer salient poles protruding from the annular-shaped yoke portion toward the outer stator; and
inner salient poles protruding from the annular-shaped yoke portion toward the inner stator,
wherein permanent magnets are fitted in gaps between the inner salient poles,
wherein no permanent magnets are fitted in gaps between the outer salient poles,
wherein each permanent magnet includes a pair agnetic poles separated from each other in the radial direction,
wherein the magnetic poles of the permanent magnets are alternately reversed such that permanent magnets which are adjacent to each other in the circumferential direction of the annular rotor have reversed magnetic poles, and
wherein each one of the outer salient poles includes a central axis, the central axis passing through a center of each one of the outer salient poles in the circumferential direction and extending in the radial direction, and the central axis passes through each one of center positions between the permanent magnets adjacent to each other in the circumferential direction.

2. The double stator-type rotary machine according to claim 1,
wherein the outer stator includes first salient poles protruding toward the annular rotor,
the inner stator includes second salient poles protruding toward the annular rotor, and
each one of the second salient poles includes a central axis, the central axis passing through a center of each one of the second salient poles in the circumferential direction and extending in the radial direction, and the central axis passes through a position different from each one of center positions of the first salient poles themselves in the circumferential direction.

3. The double stator-type rotary machine according to claim 1,
wherein a size of each one of the outer salient poles is greater than a size of each one of the inner salient poles in a circumferential direction of the annular-shaped yoke portion.

4. A double stator-type rotary machine comprising:
an annular rotor;
an outer stator disposed on an outer side of the rotor in a radial direction thereof; and
an inner stator disposed on an inner side of the rotor in the radial direction of thereof;

wherein the annular rotor includes an annular-shaped yoke portion and outer salient poles protruding from the annular-shaped yoke portion toward the outer stator, wherein the annular-shaped yoke portion includes:
an inner side portion adjacent to the inner stator and comprising permanent magnets, and
an outer side portion adjacent to the outer stator and comprising no permanent magnets, wherein the permanent magnets are arranged in a circumferential direction of the annular rotor, wherein each permanent magnet includes a pair of magnetic poles separated from each other in the radial direction, wherein the magnetic poles of the permanent magnets are alternately reversed such that permanent magnets which are adjacent to each other in the circumferential direction of the annular rotor have reversed magnetic poles, and wherein each one of the outer salient poles includes a central axis, the central axis passing through a center of each one of the outer salient poles in the circumferential direction and extending in the radial direction, and the central axis passes through each one of center positions of the permanent magnets themselves in the circumferential direction.

5. The double stator-type rotary machine according to claim 4, wherein an inner circumferential surface of the annular-shaped yoke portion has a circular shape when viewed in a direction of a rotor shaft and the permanent magnets are located on the inner circumferential surface.

6. The double stator-type rotary machine according to claim 5, wherein the permanent magnets are spaced apart from each other in the circumferential direction.

7. The double stator-type rotary machine according to claim 4,
wherein the outer stator includes first salient poles protruding toward the annular rotor,
the inner stator includes second salient poles protruding toward the annular rotor, and
each one of the second salient poles includes a central axis, the central axis passing through a center of each one of the second salient poles in the circumferential direction and extending in the radial direction, and the central axis passes through a position different from each one of center positions of the first salient poles themselves in the circumferential direction.

* * * * *

UNITED STATES PATENT AND TRADEMARK OFFICE
CERTIFICATE OF CORRECTION

PATENT NO. : 10,637,305 B2
APPLICATION NO. : 15/487541
DATED : April 28, 2020
INVENTOR(S) : Narifumi Tojima et al.

It is certified that error appears in the above-identified patent and that said Letters Patent is hereby corrected as shown below:

In the Claims

Column 6, Claim 1, Line 28, "pair agnetic" should be -- pair of magnetic --.

Signed and Sealed this
Second Day of June, 2020

Andrei Iancu
*Director of the United States Patent and Trademark Office*